United States Patent
Raval et al.

(10) Patent No.: US 10,110,128 B2
(45) Date of Patent: Oct. 23, 2018

(54) DC-DC CONVERTER HAVING FEEDFORWARD FOR ENHANCED OUTPUT VOLTAGE REGULATION

(71) Applicant: Allegro MicroSystems, LLC, Worcester, MA (US)

(72) Inventors: Pranav Raval, Nashua, NH (US); Vijay Mangtani, Nashua, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 15/453,039

(22) Filed: Mar. 8, 2017

(65) Prior Publication Data
US 2018/0262107 A1 Sep. 13, 2018

(51) Int. Cl.
*H02M 3/158* (2006.01)
*H02M 1/40* (2007.01)

(52) U.S. Cl.
CPC .............. *H02M 3/158* (2013.01); *H02M 1/40* (2013.01)

(58) Field of Classification Search
CPC . H02M 2003/1552; H02M 2001/4283; H02M 2001/4291; H02M 1/12; H02M 1/42; H02M 1/4225; H02M 1/4233; H02M 1/4241; H02M 1/4258; H02M 1/425; H02M 1/4208; H02M 3/155; H02M 3/145; H02M 3/158; H02M 3/1588; H02M 3/156
See application file for complete search history.

(56) References Cited

U.S. PATENT DOCUMENTS

| | | | |
|---|---|---|---|
| 5,912,568 | A | 6/1999 | Kiley |
| 6,977,488 | B1 | 12/2005 | Nogawa et al. |
| 6,984,967 | B2 | 1/2006 | Notman |
| 9,621,041 | B2 | 4/2017 | Sun et al. |
| 2005/0156658 | A1 | 7/2005 | Ikezawa |
| 2005/0206354 | A1 | 9/2005 | Ikezawa |
| 2005/0236904 | A1 | 10/2005 | Ikezawa |
| 2007/0052395 | A1 | 3/2007 | Belch |

(Continued)

OTHER PUBLICATIONS

"Adjustable Frequency Buck or Buck/Boost Pre-Regulator with a Synchronous Buck, 3 Internal LDOs, Window Watchdog Timer, and NPOR", A4410 Datasheet of Allegro Microsystems, Inc. Data Sheet, 41 pages, dated 2014.

(Continued)

*Primary Examiner* — Timothy J Dole
*Assistant Examiner* — Bryan R Perez
(74) *Attorney, Agent, or Firm* — Daly, Crowley Mofford & Durkee, LLP (57) ABSTRACT

Methods and apparatus for a DC-DC converter having input voltage feedforward for reducing the effects of input voltage signal transients. In embodiments, a feedback circuit receives an output voltage and generates a feedback signal and a modulation circuit receives the feedback signal and generates a control signal for a switching element configured to generate the output voltage, which is boosted from an input voltage. A feedforward module combines the input voltage and current information for an inductive energy storage element, which forms a boost circuit for generating the output voltage, and provides a feedforward signal to the modulation circuit. The modulation circuit can generate the control signal from a ramp signal and the feedforward signal.

14 Claims, 11 Drawing Sheets

(56) References Cited

U.S. PATENT DOCUMENTS

| | | |
|---|---|---|
| 2009/0058368 A1 | 3/2009 | Kanakubo |
| 2009/0262556 A1 | 10/2009 | Tomiyoshi et al. |
| 2011/0006743 A1 | 1/2011 | Fabbro |
| 2013/0307508 A1 | 11/2013 | Hallak |
| 2013/0320949 A1 | 12/2013 | Prexl et al. |
| 2015/0303807 A1 | 10/2015 | Garvey et al. |
| 2016/0006336 A1* | 1/2016 | Bennett ............... H02M 1/00 323/271 |

OTHER PUBLICATIONS

"Buck or Buck/Boost Pre-Regulator with Synchronous Buck, 5 Internal Linear Regulators, Pulse Width Watchdog Timer, and SPI", A4412 Datasheet of Allegro Microsystems, Inc., 47 pages, dated Jan. 6, 2014.
Non-Final Office Action dated May 9, 2016; for U.S. Appl. No. 14/615,050; 14 pages.
Response filed Jul. 18, 2016 to Non-Final Office Action dated May 9, 2016; for U.S. Appl. No. 14/615,050; 11 pages.
Non-Final Office Action dated Oct. 19, 2016; for U.S. Appl. No. 14/615,050; 11 pages.
Response filed Nov. 7, 2016 to Non-Final Office Action dated Oct. 19, 2016; for U.S. Appl. No. 14/615,050; 11 pages.
Notice of Allowance dated Feb. 15, 2017; for U.S. Appl. No. 14/615,050; 20 pages.
Robert Sheehan: "Understanding and Applying Current Mode-Control Theory"; Texas Instruments; Power Electronics Technology Exhibition and Conference; Oct. 31, 2007; 30 pages.

\* cited by examiner

FIG. 8

DC-DC CONVERTER HAVING FEEDFORWARD FOR ENHANCED OUTPUT VOLTAGE REGULATION

BACKGROUND

As is known in the art, DC-DC converters are used in a wide range of applications, such as to provide a regulated output voltage from a battery or other power source. Switch-mode or switching DC-DC converters use an energy storage device, such as an inductor, to store the input energy, and one or more switches to selectively couple the energy storage device to the output.

Systems may include a power bus to supply various circuit boards and circuits with power. For example, vehicles may have a power bus that is impacted by cold cranking of an engine, change-overs between gasoline power and battery power, load dump conditions, and the like. Such events may cause relatively high voltage supply signal transients during vehicle operation. For example, automobiles can have a power bus that experiences 16V to 8V transients at 1 V/µs rate. These types of input transients may present challenges for providing DC-DC converters that meet certain line transient and regulation requirements.

Figure 1:
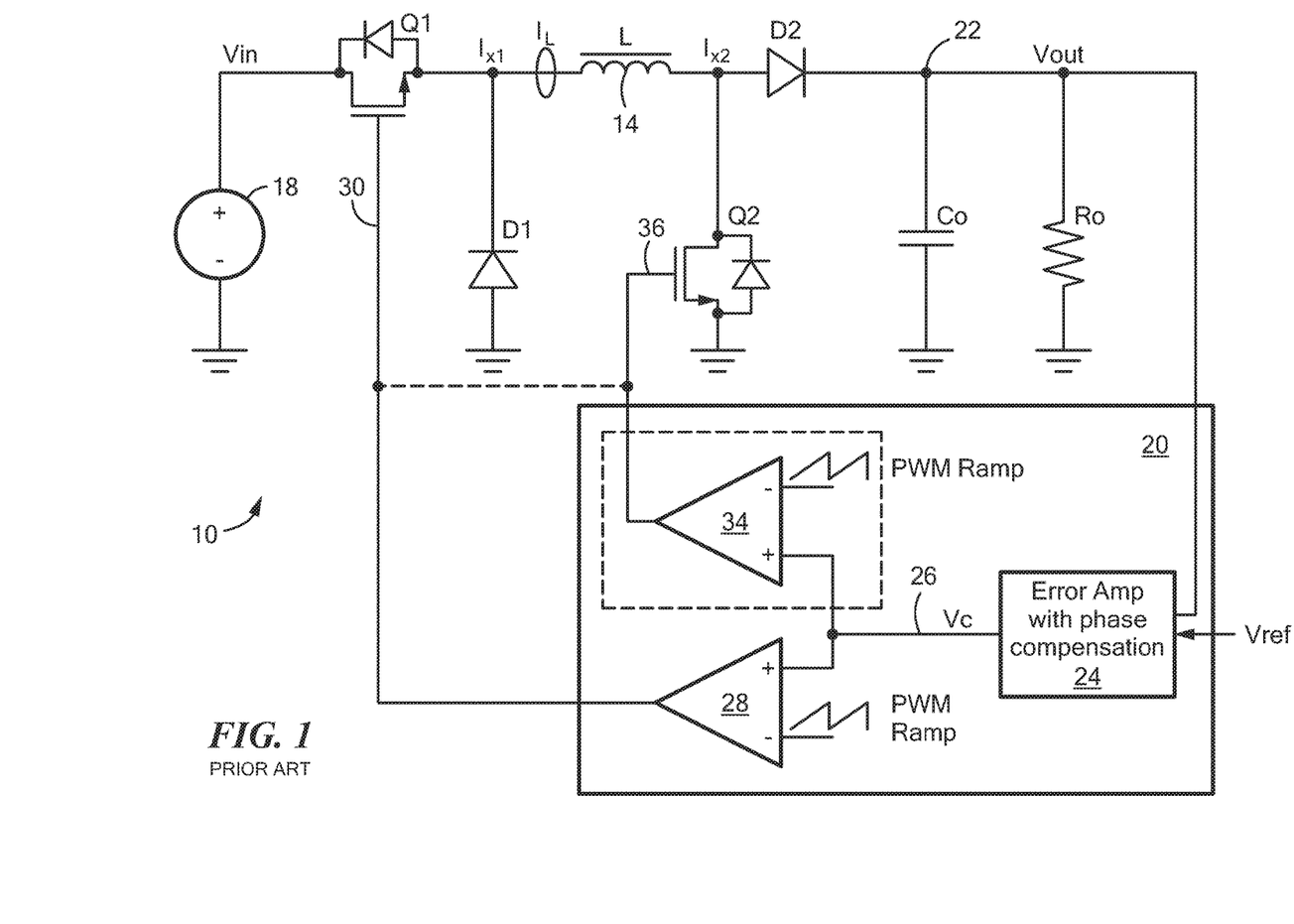
FIG. 1 is a schematic representation of a prior art Buck-Boost converter.

FIG. 1 illustrates a conventional voltage mode Buck-Boost converter 10 in which an inductor 14 is selectively coupled to an input voltage source 18 to store energy when switches Q1 and Q2 are both on or decoupled from the input voltage source to transfer energy to the load Ro at the converter output 22 through diodes D1 and D2 when switches Q1 and Q2 are both off in a Buck-Boost mode of operation. The converter 10 can be configured to operate in a purely Buck mode of operation by keeping switch Q2 off, as may be desirable when the input voltage is significantly higher than the desired output voltage or in a purely Boost mode of operation by keeping switch Q1 on, as may be desirable when the input voltage is significantly lower than the desired output voltage.

A control circuit 20 controls the duty cycle of conduction of the switches Q1 and Q2 based on feedback from the converter output 22 in order to provide the output voltage Vout at a desired, predetermined regulated voltage level. For example, the control circuit 20 may include an error amplifier 24 to generate an error signal Vc, 26 based on a difference between the converter output 22 and a reference signal Vref. The control circuit 20 may further include a comparator 28 to compare the error signal Vc to a Pulse Width Modulation (PWM) ramp signal to generate a switch control signal 30 for coupling to the gate terminal of switches Q1 and Q2. In some converters, the switches Q1 and Q2 may be independently controlled, in which case an additional comparator 34 may be provided to generate a control signal 36 to the gate terminal of switch Q2. Such independent control of the switches Q1 and Q2 permits the converter 10 to be configured in a Buck mode of operation or in a Boost mode of operation and also permits a third phase of Buck-Boost operation (i.e., operation with one of the switches Q1 and Q2 on and the other one off) as may be desirable to reduce losses and improve efficiency when transitioning between switch phases.

Figure 2:
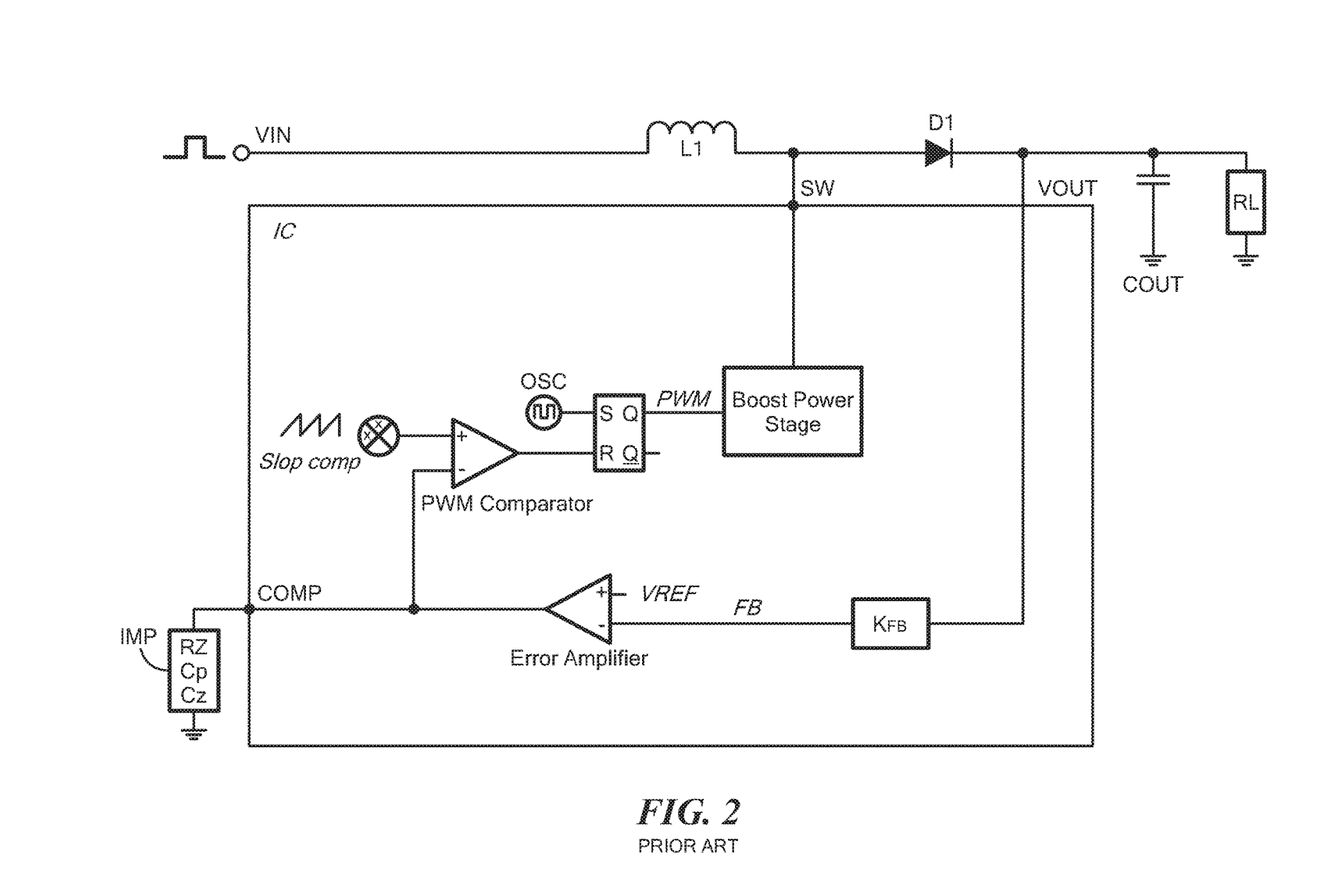
FIG. 2 is a schematic representation of a prior art voltage mode boost converter.

FIG. 2 shows a conventional voltage mode Boost converter 50 having some commonality with the prior art converter of FIG. 1. An impedance IMP provided by one or more resistive and capacitive components, for example, controls characteristics of an output voltage VOUT feedback signal. Slope compensation is provided for the ramp signal to a PWM comparator that controls a duty cycle of the switching element in the boost stage.

Figure 2A:
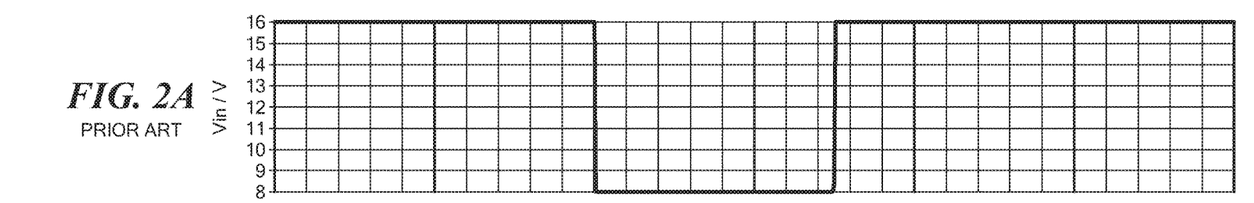
FIGS. 2A-2D show waveforms for the prior art converter of FIG. 2.
Figure 2B:
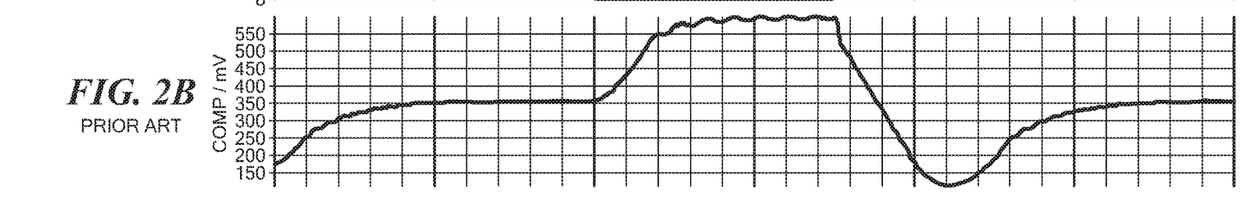
Figure 2C:
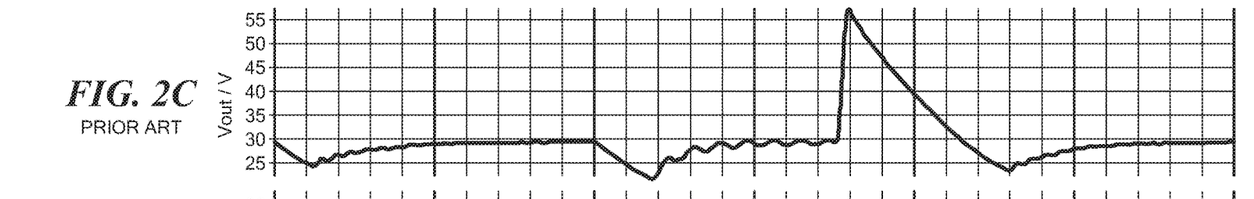
Figure 2D:
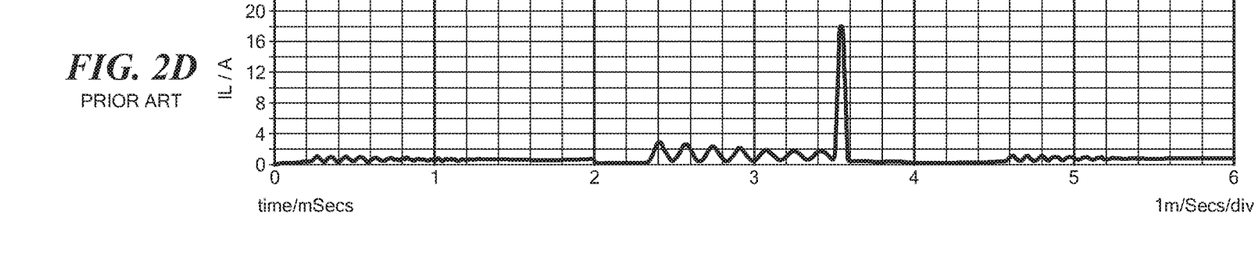

For the prior art boost converter of FIG. 2, FIG. 2A shows a waveform for Vin, FIG. 2B shows a waveform for COMP (I/O pin), FIG. 2C shows a waveform for VOUT, and FIG. 2D shows a waveform for IL (inductor L current). FIG. 2A shows a transient on Vin that drops the voltage level from 16V to 8V for about time=2 sec to about time–3.5 sec. FIG. 2B shows in response to the Vin voltage transient an overshoot and then undershoot on the COMP signal. FIG. 2C shows the output voltage VOUT response which ramps up rapidly to about 55V from about 30V at about time=3.5 sec and decays thereafter until reaching about 30V. FIG. 2D shows the inductor current IL which spikes to about 18V as the VOUT signal ramps up. Such signal behavior may not meet certain input voltage transient response requirements.

While conventional converters may be suitable for some applications, it may provide less than optimal performance for a regulated output voltage in the presence of significant input voltage signal transients since the transient response may be relatively slow as the control loop relies upon an output voltage error to adjust operation of the boost circuit.

SUMMARY

Embodiments of the invention may provide a current mode converter having input voltage feedforward to mitigate the effects of input voltage signal transients. In embodiments, output voltage overshoot and undershoot corresponding to input voltage transients may be reduced in comparison with conventional DC-DC converter configurations.

It will be appreciated that converters having enhanced output regulation characteristics are desirable in a wide range of applications. For example, output voltage regulation during input line transients is desirable for sensors and LED drivers. In certain applications, feedback information from one or more LEDs is used to set the target output voltage of a boost converter which drives the LEDs. The LEDs turn on when potential across anode and cathode are above a forward voltage of the LED. Significant loss in illumination from the LEDs can occur when the voltage across LED is drops –0.5V below the forward voltage, for example. For typical LEDs, more than about 1 Volt of disturbance can cause significant brightness variation of light emitted by the LEDs.

It will be appreciated by those of ordinary skill in the art that while current mode converters may improve loop bandwidth and enhance output transient and line regulation performance, this may be challenging for different load currents and output capacitors. In general, current mode boost converters have reduced loop bandwidth due to a larger output filter. Also, RHPZ (right half-plane zero) may reduce the rate of average inductor current change which may render feedforward weaker in current mode converters. As is known in the art, the presence of a right-half-plane zero (RHPZ) may limit the maximum duty-cycle slew rate by rolling off the crossover frequency because the average inductor current cannot instantaneously change and is also slew-rate limited by the available transient average voltage across the inductor. By clamping the duty-cycle speed of change, the inductor current builds up at a pace where it can follow the output current increase demand and prevent converter instability.

Embodiments of the invention may provide a current mode converter that combines input voltage feedforward with boost inductor current information to change the duty cycle of a boost circuit switching element more rapidly than conventional converters when an input-to-output voltage ratio changes. Rapid duty cycle response can mitigate the effects of input voltage signal transients. In embodiments, output voltage overshoot and undershoot corresponding to input voltage transients may be reduced in comparison with conventional DC-DC converter configurations.

In one aspect a system comprises: a feedback circuit to receive an output voltage and generate a feedback signal; a modulation circuit to receive the feedback signal and generate a control signal for a switching element configured to generate the output voltage, which is boosted from an input voltage; and a feedforward module to combine a slope compensation signal, the input voltage, and current information for an inductive energy storage element, which forms a boost circuit for generating the output voltage, and generate a ramp signal to the modulation circuit, wherein the modulation circuit is configured to generate the control signal from the ramp signal and the feedback signal.

An example system can further include one or more of the following features: the input voltage and current information for the inductive energy storage element are combined and provided as a first input to a signal combiner and the slope compensation signal is provided as a second input to the signal combiner, an output of the signal combiner provides the ramp signal, the ramp signal is provided as a first input of a comparator and the feedback signal is provided as a second input of the comparator, an output of the comparator is combined with an oscillator signal to generate the control signal for the switching element, a duty cycle of the control signal is proportional to an impedance compensation input and inversely proportional to the input voltage, the current information, and the slope compensation, a duty cycle of the control signal is proportional to an impedance compensation input, inversely proportional to the slope compensation and the input voltage, and inversely proportional to the inductor current, and/or a duty cycle of the control signal is proportional to a difference of an impedance compensation circuit and the input voltage and inversely proportional to the slope compensation and the current information. In an embodiment, a system is provided as an integrated circuit package.

In another embodiment, a method comprises: receiving an output voltage as feedback an output voltage and generating a feedback signal; receiving the feedback signal and generating a control signal for a switching element configured to generate the output voltage, which is boosted from an input voltage; and combining a slope compensation signal, the input voltage, and current information for an inductive energy storage element, which forms a boost circuit for generating the output voltage; generating a ramp signal; and generating the control signal from the ramp signal and the feedback signal.

An example method can further include one or more of the following features: the input voltage and current information for the inductive energy storage element are combined and provided as a first input to a signal combiner and the slope compensation signal is provided as a second input to the signal combiner, an output of the signal combiner provides the ramp signal, the ramp signal is provided as a first input of a comparator and the feedback signal is provided as a second input of the comparator, an output of the comparator is combined with an oscillator signal to generate the control signal for the switching element, a duty cycle of the control signal is proportional to an impedance compensation input and inversely proportional to the input voltage, the current information, and the slope compensation, a duty cycle of the control signal is proportional to an impedance compensation input, inversely proportional to the slope compensation and the input voltage, and inversely proportional to the inductor current, and/or a duty cycle of the control signal is proportional to a difference of an impedance compensation circuit and the input voltage and inversely proportional to the slope compensation and the current information. In an embodiment, an integrated circuit package configured to perform a method.

In a further aspect, an integrated circuit package converter comprises: a feedback means for receiving an output voltage and generating a feedback signal; a modulation means for receiving the feedback signal and generating a control signal for a switching element configured to generate the output voltage, which is boosted from an input voltage and for generating the control signal from a ramp signal and the feedback signal; and a feedforward means to combine a slope compensation signal, the input voltage, and current information for an inductive energy storage element, which forms a boost circuit for generating the output voltage, and generating the ramp signal for the modulation means.

An example converter can further include one or more of the following features: the input voltage and current information for the inductive energy storage element are combined and provided as a first input to a signal combiner and the slope compensation signal is provided as a second input to the signal combiner, an output of the signal combiner provides the ramp signal, the ramp signal is provided as a first input of a comparator and the feedback signal is provided as a second input of the comparator, an output of the comparator is combined with an oscillator signal to generate the control signal for the switching element, a duty cycle of the control signal is proportional to an impedance compensation input and inversely proportional to the input voltage, the current information, and the slope compensation, a duty cycle of the control signal is proportional to an impedance compensation input, inversely proportional to the slope compensation and the input voltage, and inversely proportional to the inductor current, and/or a duty cycle of the control signal is proportional to a difference of an impedance compensation circuit and the input voltage and inversely proportional to the slope compensation and the current information.

BRIEF DESCRIPTION OF THE DRAWINGS

The foregoing features of this invention, as well as the invention itself, may be more fully understood from the following description of the drawings in which.

DETAILED DESCRIPTION

Figure 3:
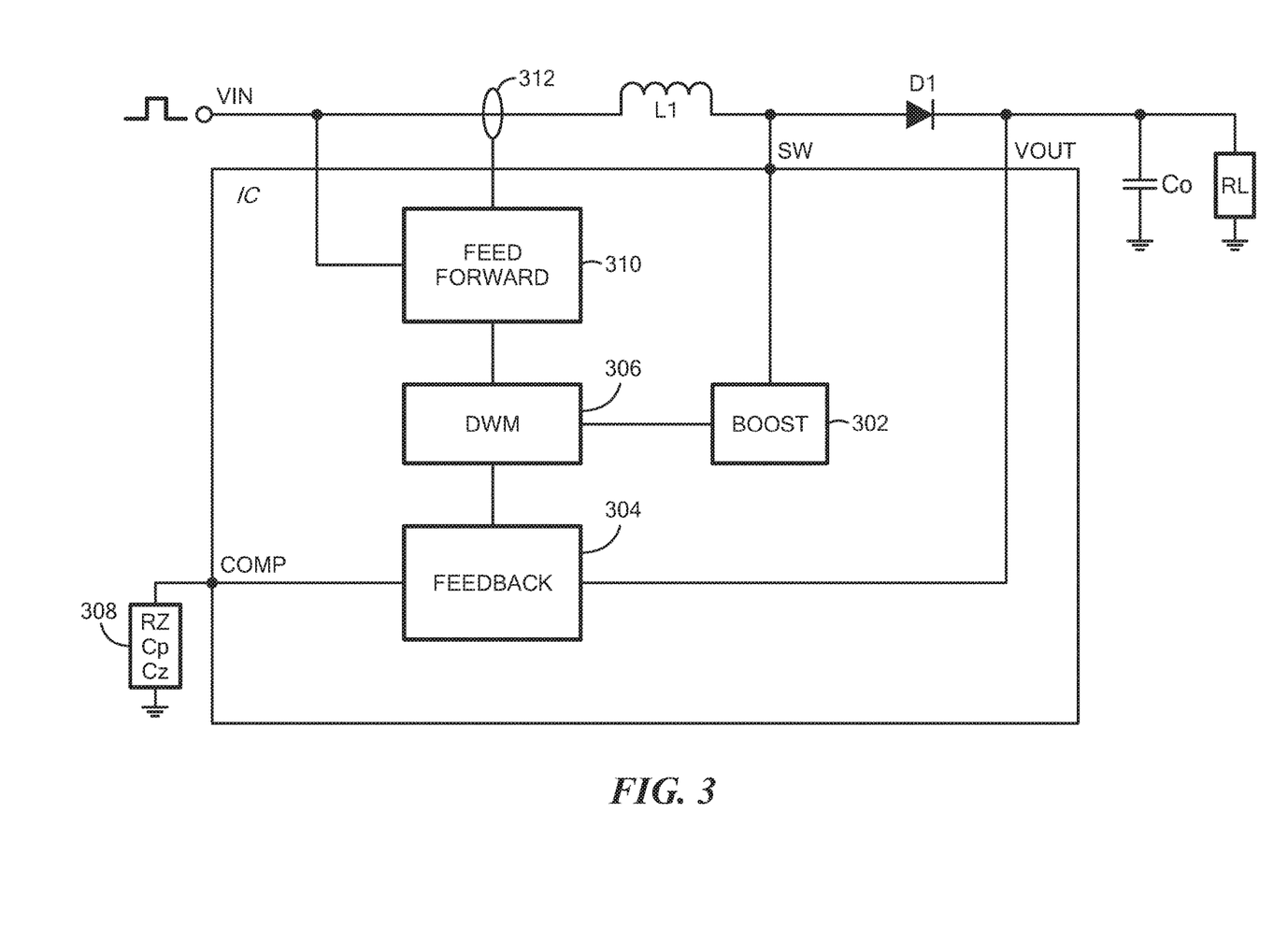
FIG. 3 is a block diagram of a current mode boost converter having input voltage feedforward in accordance with example embodiments of the invention.

FIG. 3 shows a current mode boost converter 300 having input voltage VIN feedforward to enhance output transient response in accordance with illustrative embodiments of the invention. In embodiments, VIN feedforward information is combined with slope compensation and/or inductor current to more rapidly adjust a duty cycle of the boost switching element.

An input voltage signal VIN is provided to an inductor L1 and diode D1 coupled in a boost configuration in which a boost module 302 is coupled to a node SW between the inductor L1 and diode D1 to boost the input voltage and provide an output voltage VOUT, which can drive a load RL. A capacitor CO can be coupled in parallel with the load RL for signal smoothing, for example.

The output voltage VOUT is fed back to a feedback module 304, which provides a feedback signal to pulse width modulation (PWM) module 306. In embodiments, an impedance module 308, which include one or more components, such as capacitors, resistors, and inductors, provides a desired impedance characteristic for the feedback. A feedforward module 310 receives the input voltage VIN and a current level IL, which can be provided by a current sensor 312 at the input to the inductor L1, and generates an output signal for the boost module 302. In embodiments, the boost module 302 includes at least one switching element for PWM switching to provide desired characteristics for the output voltage signal VOUT.

Figure 4:
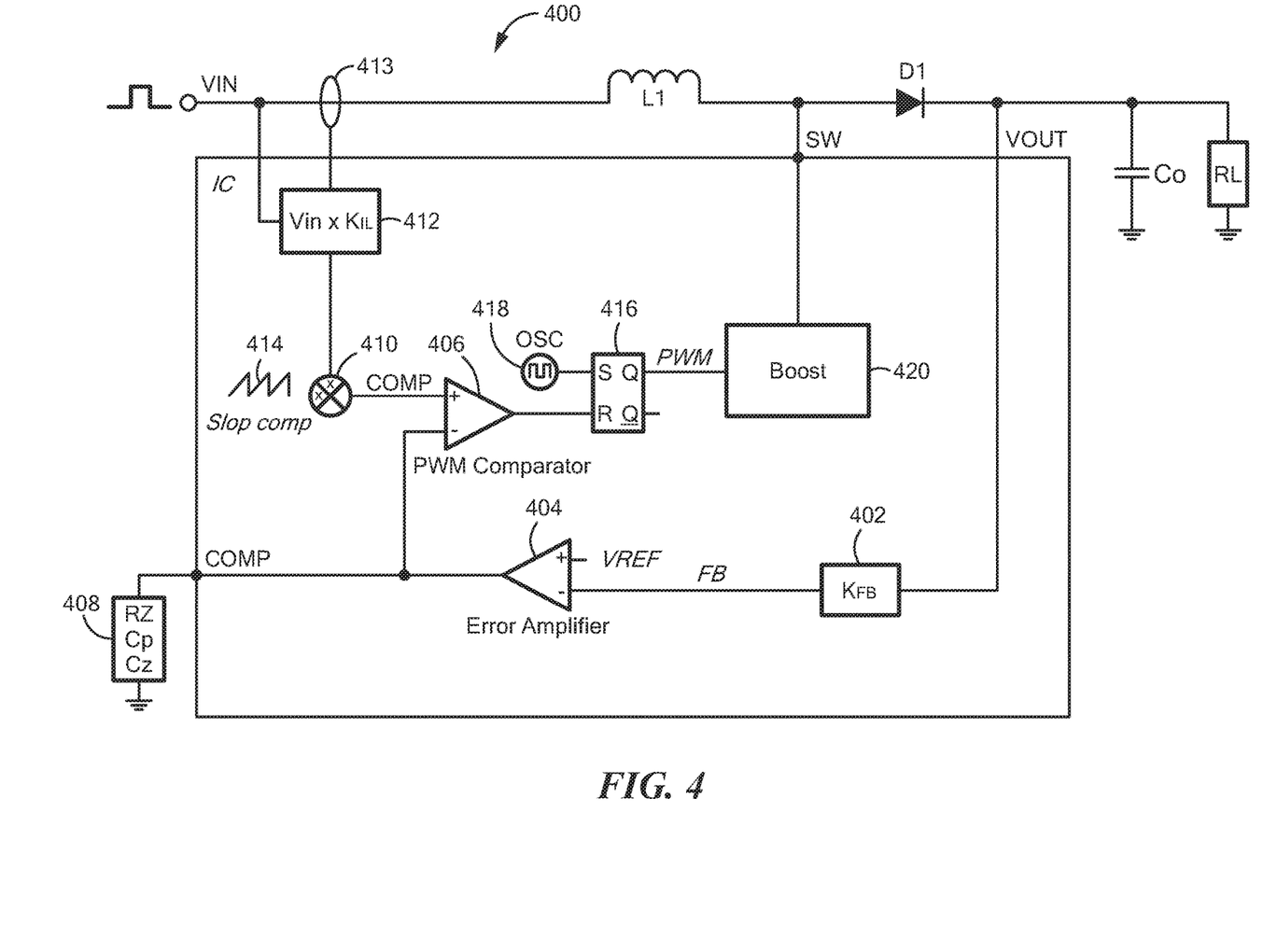
FIG. 4 is an example circuit implementation of the converter of FIG. 3.

FIG. 4 shows an example circuit implementation 400 of the current mode boost converter 300 of FIG. 3. An illustrative pinout for one particular integrated circuit (IC) package embodiment is shown having I/O pins as VIN, VOUT, SW, and COMP. It is understood that any suitable IC package and I/O pinout can be used to meet the needs of a particular implementation.

In the illustrated embodiment 400, a first inductor L1 and first diode D1 are coupled end-to-end as external components, where the output voltage VOUT is located at the cathode of the first diode D1 for driving the load RL. The VOUT signal is fed back to a feedback module 402, which can have a gain parameter KFB providing desirable characteristics Scaling of VOUT may be desirable to compare the error with respect to internal reference at error amplifier. For example, if the output is 5V and internal reference for error calculation is also 5V then Kfb=1 means no scaling is required. If output(VOUT) is 50V but internal reference is only 5V then Kfb=0.1 means a resistor divider, for example, can be used to scale down the output voltage ten times lower for comparison.

In embodiments, an output of the feedback module 402 is provided as one input to an error amplifier 404. In embodiments, a second input of the error amplifier 404 is a reference voltage VREF. For example, the output can be referenced to any desired voltage level, such as 30V shown in FIG. 5. The error amplifier 404 output is coupled to an input of a comparator 406. In the illustrated embodiment, an impedance module 408 is provided by one or more external components for connection to the output of the error amplifier 404 to provide desired signal characteristics. In embodiments, impedance module 408 comprises a representation of the average error. A capacitor at the COMP pin can store the error information processed by error amplifier and fed to the PWM comparator 406. A second input to the comparator 406 is provided as a ramp signal that has slope compensation and VIN feedforward information from the output of a signal combiner 410, as described more fully below.

It understood that slope compensation of the ramp signal may reduce or eliminate instability under certain operation conditions, such as duty cycles over fifty percent. A difference between an average current of the boost inductor L1 and the sampled inductor current can result in instability referred to as sub-harmonic oscillation, which can occur when inductor ripple current does not return to an initial value before the start of the next switching cycle.

In embodiments, a feed forward module 412 receives the input voltage VIN and a current level at the input of the first inductor L1 from which parameter $K_{IL}$ is generated. In embodiments, $K_{IL}$ provides scaling of the inductor current information. A sensor 413, such as a sense resistor, can provide the inductor current level. The output of the feedforward module 412 is provided as an input to the signal combiner 410, which also receives a slope compensation signal 414. In embodiments, the signal combiner 410 adds the slope compensation signal 414 and the output of the feedforward module 412. The combiner 410 output is provided as a ramp signal to the comparator 406.

In the illustrated embodiment, a latch module 416 reset R input receives the output of the comparator 406 and the latch module set S input receives an oscillator signal 418. The latch 416 output signal provides a PWM signal for a boost module 420 that includes at least one switching element controlled by the PWM signal. The boost module 420 drives the SW pin of the IC package to control the output voltage VOUT. With this arrangement, a duty cycle of the boost switching element, which controls the output voltage VOUT, is proportional to Comp−[(Vin+IL)+Slop compensation]. In accordance with the illustrated embodiment, a duty cycle of the control signal is proportional to an impedance compensation input and inversely proportional to the input voltage, the current information, and the slope compensation.

In embodiments, the impact of signal transients on the input voltage signal VIN is mitigated to improve output voltage VOUT regulation by enabling more rapid duty cycle adjustment of the boost circuit switching element, as compared with conventional current mode converters.

Figure 4A:
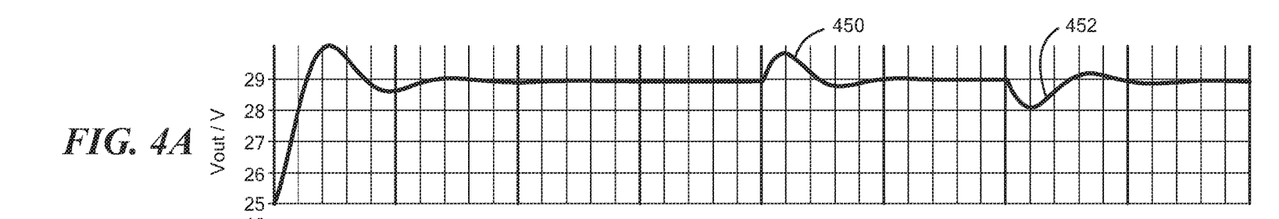
FIGS. 4A-4D are example waveforms for the converter circuit of FIG. 4.
Figure 4B:
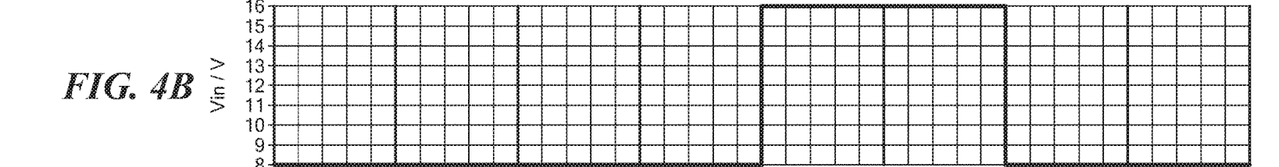

FIGS. 4A-4D show example waveforms for the current mode boost converter 400 of FIG. 4. FIG. 4A shows an example output voltage Vout with a steady state of about 29V and transients of about +/0.8V in response to the input voltage signal VIN of FIG. 4B having a first step at time=2 from about 8V to 16V and then a second step at time t=3 from 16V to 8V. As can be seen, the first step in the input voltage Vin results in a first transient 450 (overshoot) in the output voltage Vout in FIG. 4A and the second step results in a second transient 452 (undershoot) in the output voltage.

Figure 4C:
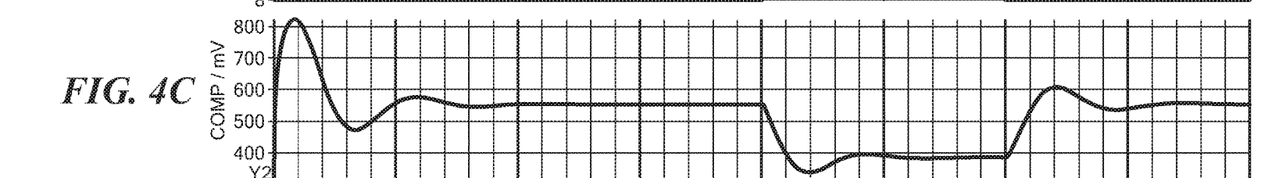
Figure 4D:
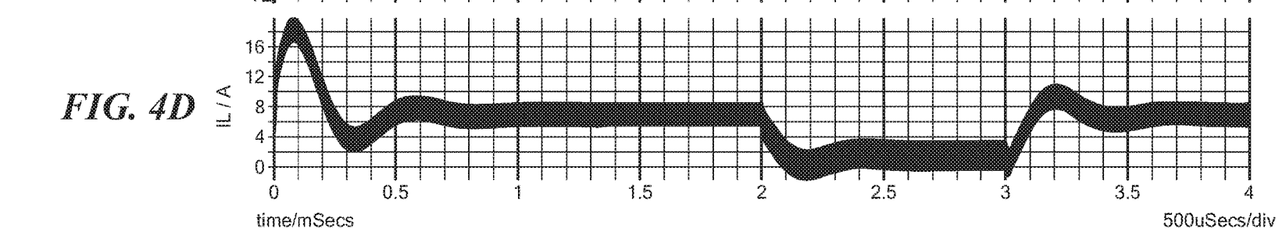

FIG. 4C shows an example current through the first inductor L1 of FIG. 4. As can be seen, the first and second steps in the input voltage VIN result in corresponding transients in the inductor current. FIG. 4D shows an example waveform at the COMP I/O of the IC of FIG. 4, which corresponds to the output of the error amplifier 404. The COMP waveform also has a transient response to the step changes in the input voltage VIN.

Figure 5A:
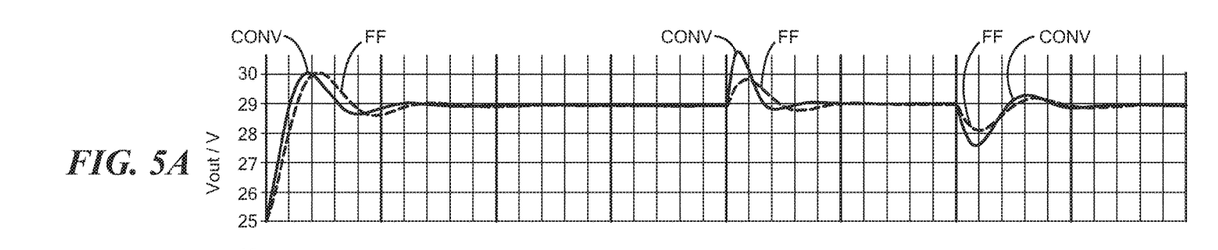
FIGS. 5A-5D shows waveform comparisons for the converter of FIG. 4 and a conventional converter.
Figure 5B:
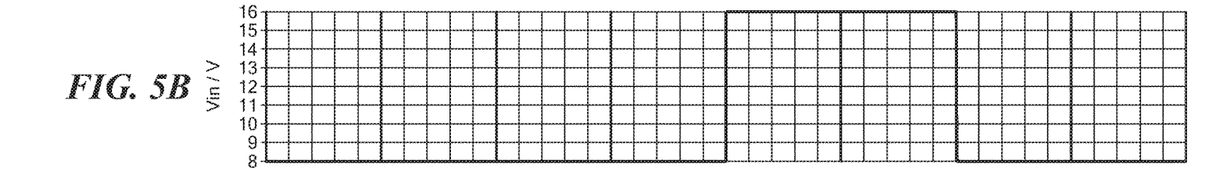
Figure 5C:
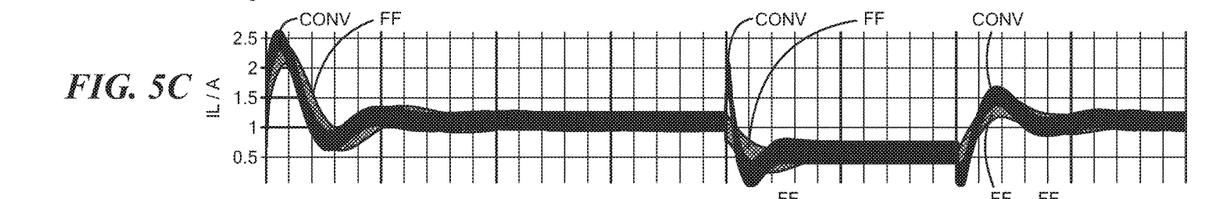
Figure 5D:
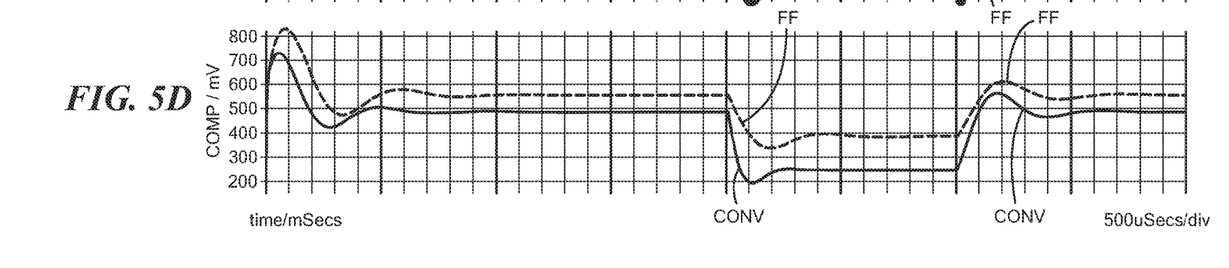

FIGS. 5A-D show VOUT, VIN, IL, and COMP waveforms respectively for the feedforward converter circuit of FIG. 4, for example, indicated by FF and waveforms for a conventional current mode converter indicated by CONV. As can be see in FIG. 5A, the output voltage VOUT transient response to the voltage step in the input voltage of FIG. 5B provided by feedforward embodiments is significantly improved over the VOUT response of a conventional converter. In the example shown, overshoot and undershoot are reduced by about 50% over conventional current mode converter circuits.

Input voltage VIN feedforward embodiments enable more rapid adjustment in the duty cycle of the boost switching element when an input to output voltage ratio changes. Combining input voltage feed forwarding with slope compensation reduces overshoot and undershoot of the boost output and improves output transient performance compared with conventional converter circuits.

Figure 6:
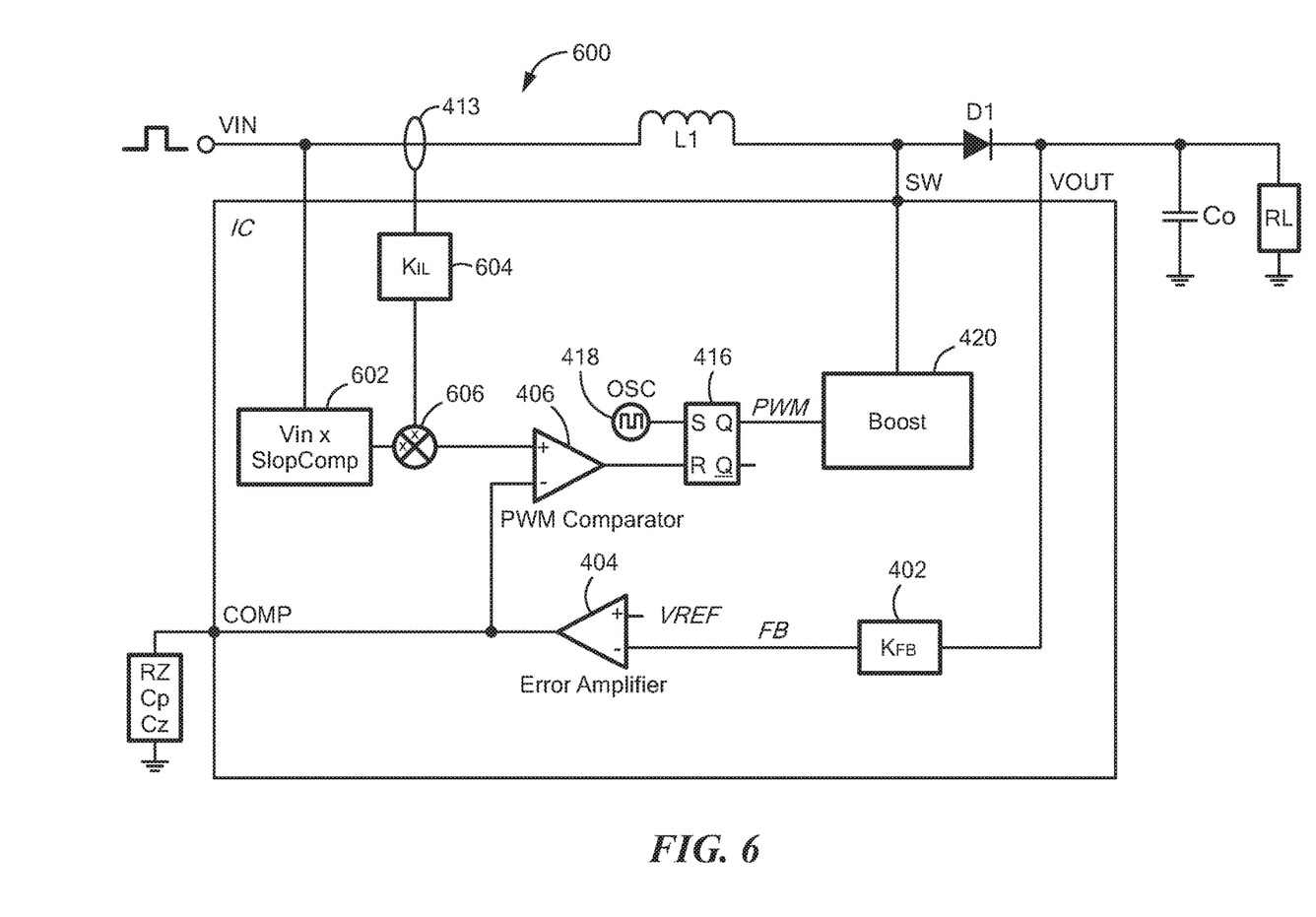
FIG. 6 shows an example circuit implementation of the converter of FIG. 3.

FIG. 6 shows a current mode converter 600 having an alternative input voltage feedforward implementation in accordance with example embodiments of the invention having some commonality with the circuit of FIG. 4 where like reference numbers indicate like elements. The converter 600 includes a VIN feedforward module 602 that combines the input voltage VIN with a slope compensation signal. A current feedforward module 604 receives inductor L1 current level information and generates a scaling $K_{IL}$ parameter. A signal combiner 606 combines the output of the VIN feedforward module and slop comp the with inductor current module 604. Combiner 606 provides the ramp input to the PWM comparator 406. With this arrangement, a duty cycle of the boost switching element, which controls the output voltage VOUT, is proportional to COMP−[(Vin+Slop compensation)+IL]. In the illustrated embodiment, a duty cycle of the control signal is proportional to an impedance compensation input, inversely proportional to the slope compensation and the input voltage, and inversely proportional to the inductor current.

Figure 6A:
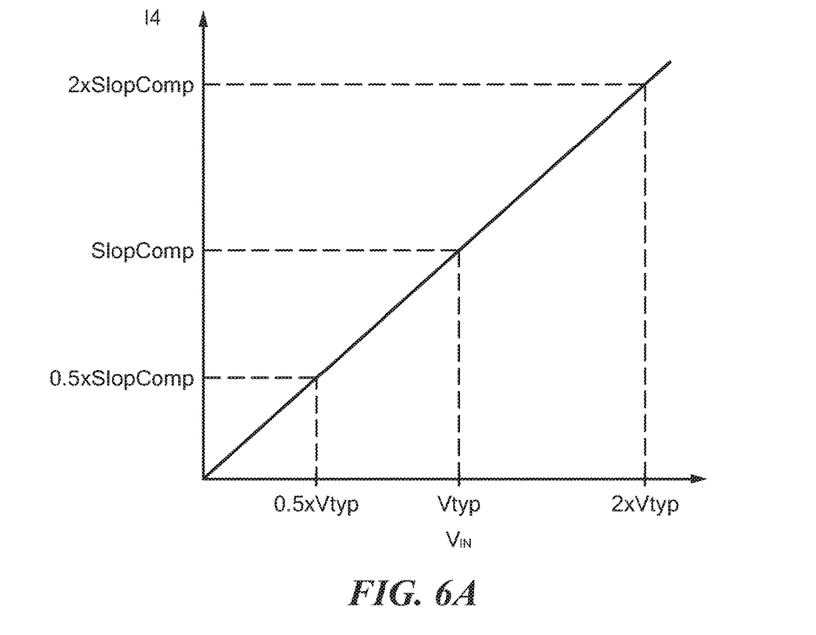
FIG. 6A shows example waveforms for input voltage and slope compensation.

FIG. 6A shows the saw tooth ramp at the input of the module 406 of FIG. 6. The slope of the ramp changes with respect to input voltage Vin supply change.

Figure 6B:
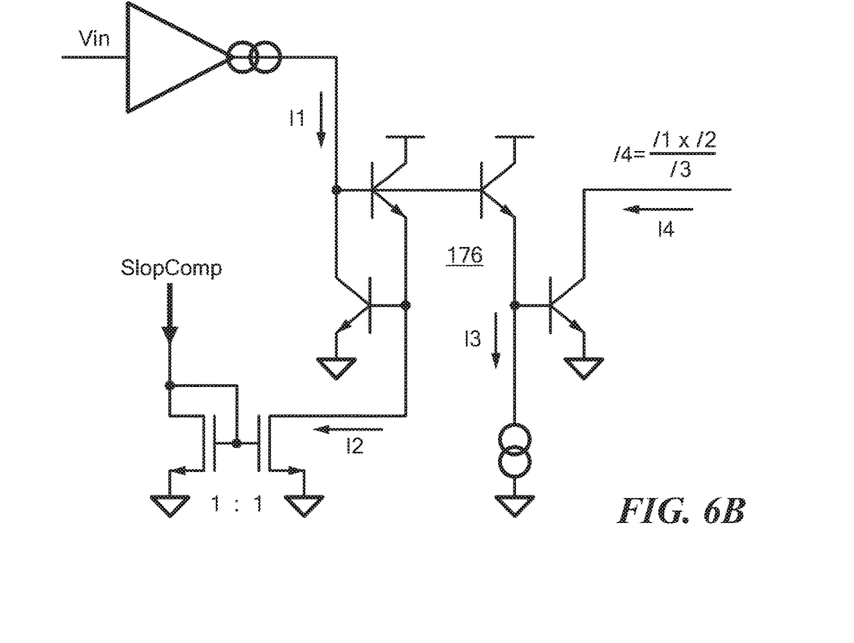
FIG. 6B shows further detail of a portion of the circuit implementation of FIG. 6.

FIG. 6B shows an example implementation of VIN× SlopComp 602 in FIG. 6 where current I4 is the output of the multiplier. Current I3 represents a typical input voltage Vin. For example, a typical input voltage Vin supply is about 12V so that I1 and I3 are same, and thus I4=SlopComp. If Vin change from 12V to say 18V or 6V, then I4 is the ratio of I1, which represents Vin, and the fixed current source I3.

Figure 7:
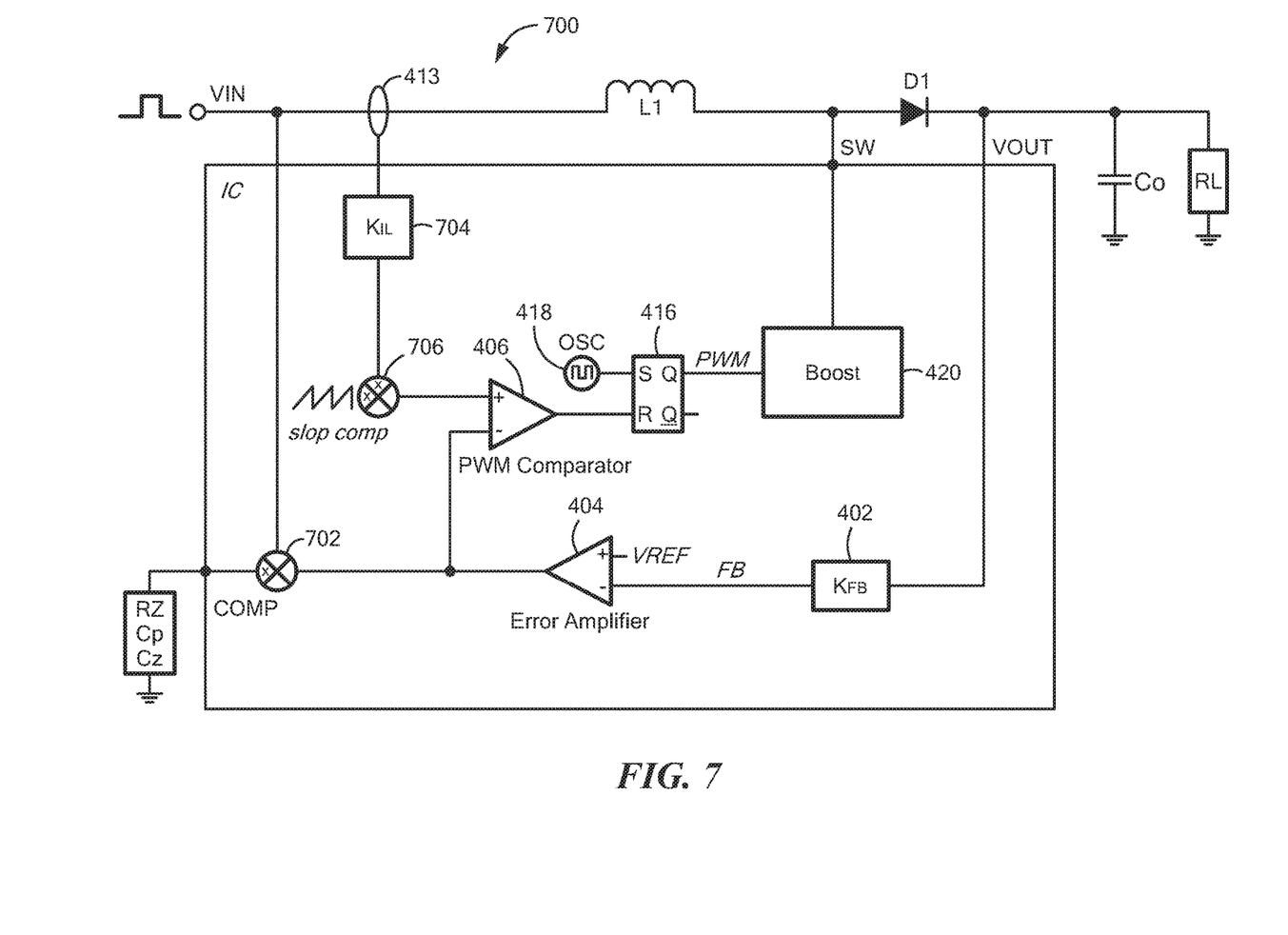
FIG. 7 shows an example circuit implementation of the converter of FIG. 3.
Figure 8:
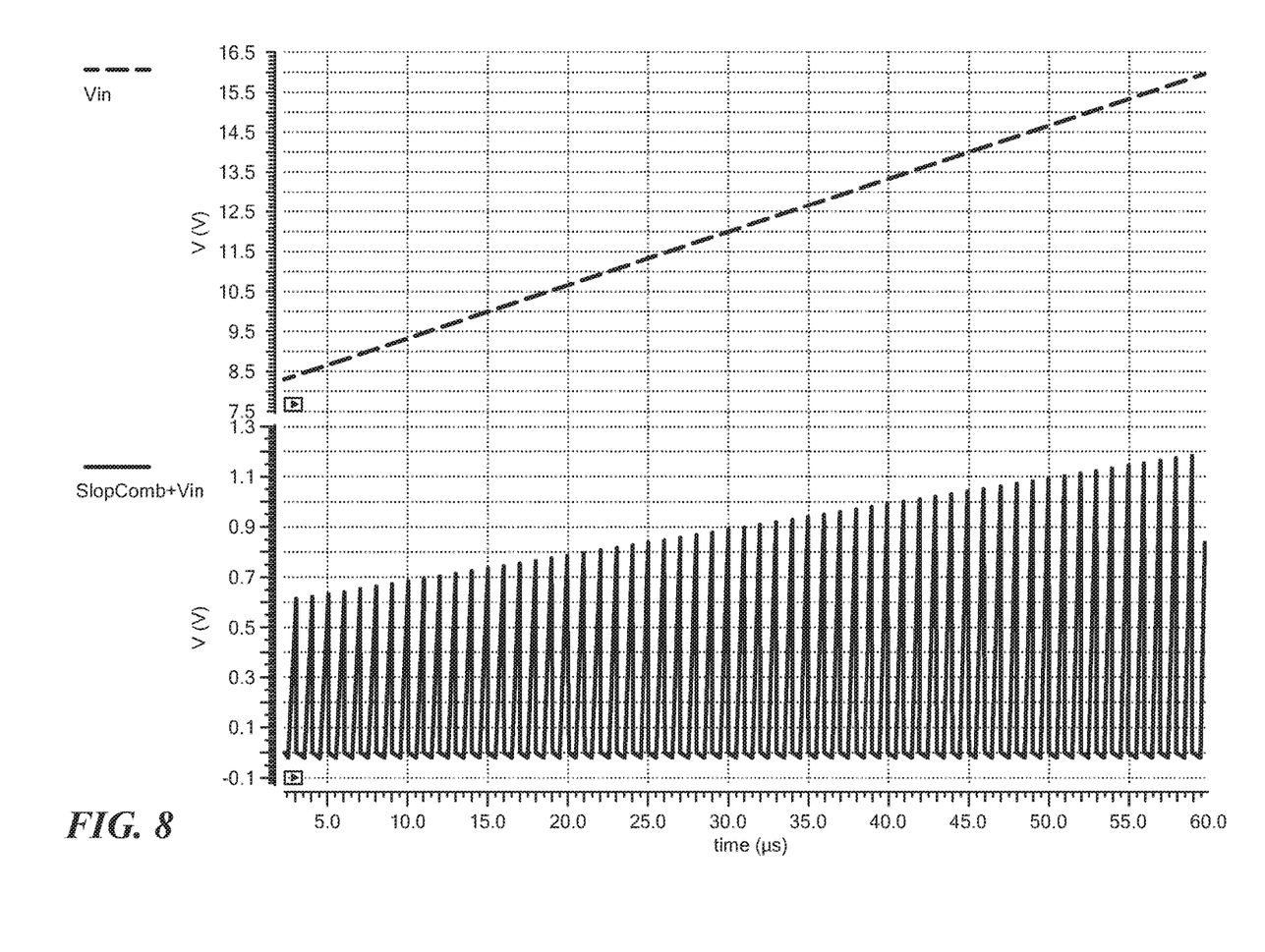
FIG. 8 shows example waveforms for input voltage and slope compensation.

FIG. 7 shows a current mode converter 700 having an alternative input voltage feedforward implementation in accordance with example embodiments of the invention having some commonality with the circuits of FIG. 4 and FIG. 6, where like reference numbers indicate like elements. The converter 700 includes a signal combiner 702 having a first input as the COMP signal and a second input as the input voltage VIN. The signal combiner 702 output is coupled to the output of the error amplifier 404 and provided as an input to the PWM comparator 406. In the illustrated embodiment, the input voltage VIN is subtracted by the signal combiner 702.

A current feedforward module 704 receives inductor L1 current level information. A signal combiner 706 combines the output of the current feedforward module 704 and the slope compensation signal to provide a ramp input to the PWM comparator 406. With this arrangement, a duty cycle of the boost switching element, which controls the output voltage VOUT, is proportional to [(Comp−Vin)−(Slopecomp+IL)]. In the illustrated embodiment, a duty cycle of the control signal is proportional to a difference of an impedance compensation circuit and the input voltage and inversely proportional to the slope compensation and the current information.

In embodiments, duty cycle control features from FIG. 6 and FIG. 7 can be combined. That is, duty cycle control of the boost switching element as COMP−[(Vin+Slop compensation)+IL] can be combined with duty cycle control as [(Comp−Vin)−(Slopecomp+IL)], for example.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A system comprising:
a feedback circuit to receive an output voltage and generate a feedback signal;
a modulation circuit to receive the feedback signal and generate a control signal for a switching element configured to generate the output voltage, which is boosted from an input voltage; and
a feedforward module to combine a slope compensation signal, the input voltage, and current information for an inductive energy storage element, which forms a boost circuit for generating the output voltage, and generate a ramp signal to the modulation circuit, wherein the modulation circuit is configured to generate the control signal from the ramp signal and the feedback signal, wherein a duty cycle of the control signal is proportional to an impedance compensation input and inversely proportional to the input voltage, the current information, and the slope compensation.

2. The system according to claim 1, wherein the input voltage and current information for the inductive energy storage element are combined and provided as a first input to a signal combiner and the slope compensation signal is provided as a second input to the signal combiner.

3. The system according to claim 2, wherein an output of the signal combiner provides the ramp signal.

4. The system according to claim 3, wherein the ramp signal is provided as a first input of a comparator and the feedback signal is provided as a second input of the comparator, wherein an output of the comparator is combined with an oscillator signal to generate the control signal for the switching element.

5. The system according to claim 1, wherein the system is provided as an integrated circuit package.

6. A method, comprising:
receiving an output voltage as feedback and generating a feedback signal;
receiving the feedback signal and generating a control signal for a switching element configured to generate the output voltage, which is boosted from an input voltage; and combining a slope compensation signal, the input voltage, and current information for an inductive energy storage element, which forms a boost circuit for generating the output voltage;

generating a ramp signal; and generating the control signal from the ramp signal and the feedback signal, wherein a duty cycle of the control signal is proportional to an impedance compensation input and inversely proportional to the input voltage, the current information, and the slope compensation.

7. The method according to claim 6, wherein the input voltage and current information for the inductive energy storage element are combined and provided as a first input to a signal combiner and the slope compensation signal is provided as a second input to the signal combiner.

8. The method according to claim 7, wherein an output of the signal combiner provides the ramp signal.

9. The method according to claim 8, wherein the ramp signal is provided as a first input of a comparator and the feedback signal is provided as a second input of the comparator, wherein an output of the comparator is combined with an oscillator signal to generate the control signal for the switching element.

10. An integrated circuit package configured to perform the method of claim 6.

11. An integrated circuit package converter, comprising: a feedback circuit for receiving an output voltage and generating a feedback signal; a modulation means for receiving the feedback signal and generating a control signal for a switching element configured to generate the output voltage, which is boosted from an input voltage and for generating the control signal from a ramp signal and the feedback signal; and a feedforward circuit to combine a slope compensation signal, the input voltage, and current information for an inductive energy storage element, which forms a boost circuit for generating the output voltage, and generating the ramp signal for the modulation means, wherein a duty cycle of the control signal is proportional to an impedance compensation input and inversely proportional to the input voltage, the current information, and the slope compensation.

12. The converter according to claim 11, wherein the input voltage and current information for the inductive energy storage element are combined and provided as a first input to a signal combiner and the slope compensation signal is provided as a second input to the signal combiner.

13. The converter according to claim 12, wherein an output of the signal combiner provides the ramp signal.

14. The converter according to claim 13, wherein the ramp signal is provided as a first input of a comparator and the feedback signal is provided as a second input of the comparator, wherein an output of the comparator is combined with an oscillator signal to generate the control signal for the switching element.

* * * * *